United States Patent
Orita et al.

(10) Patent No.: US 6,192,715 B1
(45) Date of Patent: Feb. 27, 2001

(54) FURNACE FOR FORMING OPTICAL FIBER

(75) Inventors: Nobuaki Orita, Chiba; Tetsuya Kumada; Yoshiyuki Sakata, both of Mie; Hisashi Koaizawa, Chiba, all of (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/245,340

(22) Filed: Feb. 5, 1999

(51) Int. Cl.$^7$ ..................................................... C03B 37/07
(52) U.S. Cl. ................. 65/489; 65/379; 65/476; 65/477; 65/537
(58) Field of Search .............................. 65/379, 476, 477, 65/489, 492, 537, 538, 539, 540

(56) References Cited

U.S. PATENT DOCUMENTS

| | | | |
|---|---|---|---|
| 4,673,428 | * 6/1987 | Greene et al. | 65/374 |
| 5,897,682 | * 4/1999 | Koaizawa et al. | 65/489 |
| 5,974,838 | * 11/1999 | Uhm et al. | 65/489 |

FOREIGN PATENT DOCUMENTS

| | | |
|---|---|---|
| 57-140330 | 8/1982 | (JP). |
| 59-153332 | 10/1984 | (JP). |
| 64-18934 | 1/1989 | (JP). |
| 2-92838 | 4/1990 | (JP). |

* cited by examiner

*Primary Examiner*—Sean Vincent
(74) *Attorney, Agent, or Firm*—Arent Fox Kintner Plotkin & Kahn, PLLC

(57) ABSTRACT

An optical fiber drawing furnace capable of the prevention of entry of an ambient gas into an inner space thereof both effectively and economically, provided with a lower gas introduction portion through which inert gas is introduced into the inner space of the optical fiber drawing furnace, a chamber separated by a lower partition, and a bottom cover. The lower partition is arranged immediately below the lower gas introduction portion and has a first hole through which the chamber and the inner space are communicated. The bottom cover has a second hole through which the chamber and the atmosphere are communicated. An optical fiber is passed through the first and second holes. A controller detects a differential pressure between a pressure P1 in the inner space and a pressure P2 in the chamber and controls the suction flow by a pump for evacuating the gas in the chamber to maintain P1>P2. The sizes of the first and second holes are defined as (L1/D1)<(L2/D2), where L1 and L2 are lengths of the holes and D1 and D2 are the diameters of the holes.

16 Claims, 8 Drawing Sheets

FURNACE FOR FORMING OPTICAL FIBER

BACKGROUND OF THE INVENTION

1. Field of the Invention

The present invention relates to a furnace for forming an optical fiber which heats, melts, and draws an optical fiber preform to produce an optical fiber (optical fiber drawing furnace), more particularly an optical fiber drawing furnace provided with a means for preventing entry of ambient air from the outside of the optical fiber drawing furnace at a bottom thereof.

2. Description of the Related Art

There is strong demand for the improvement of the productivity of optical fibers due to the rapid increase in applications of optical fibers. To satisfy this demand, attempts are being made to increase the diameter of the optical fiber preform to be drawn and to raise the drawing speed. The high speed drawing of an optical fiber preform having a large diameter, however, causes the pressure in an inner space of an optical fiber drawing furnace to vary more due to the vibration of the moving optical fiber preform having the large diameter which in turn causes variations in the drawing speed of the optical fiber and variations in the diameter of the drawn optical fiber. Sometimes, the pressure in the inner space of the optical fiber drawing furnace becomes lower than the atmospheric pressure (pressure outside optical fiber drawing furnace). If the pressure in the inner space of the optical fiber drawing furnace is lower than that of the atmosphere, air may invade the inner space to contact the surface of the optical fiber preform, the surface of the drawn optical fiber, and the inner surface of a furnace tube arranged in the optical fiber drawing furnace. The contact of the surfaces of the optical fiber preform and the optical fiber by air results in deterioration of the quality of the drawn optical fiber and weakens the mechanical strength of the drawn fiber. The contact of the inner surface of the furnace tube with air shortens the life of the tube. Accordingly, a variety of improvements have been experimented with.

One approach for overcoming the above problem is to increase the amount of inert gas which is introduced and filled in the inner space of the optical fiber drawing furnace. The increase of the amount of inert gas introduced into the inner space, however, lowers the temperature of the optical fiber preform and makes it necessary to raise the heating temperature of the heater to maintain a suitable temperature for drawing the optical fiber in the inner space. Since the furnace tube is usually made of carbon, the raise of the heating temperature may accelerate the deterioration of the furnace tube. The rapid deterioration of the furnace tube causes the rapid generation of carbon duct which in turn reduces the quality and strength of the optical fiber. The rapid deterioration of the furnace tube, i.e., the insufficient life of the furnace tube, therefore makes it necessary to frequently replace the furnace tube, resulting in troublesome maintenance and increased production costs.

Other countermeasures have been devised as well. FIG. 1 is a sectional view of an optical fiber drawing furnace 101 of the related art.

The optical fiber drawing furnace 101 includes a furnace body 104, a heater 103 for heating and melting an optical fiber preform 105 introduced into an inner space 108 of the furnace body 104 from the top of the furnace body 104, a furnace tube 102 arranged at an inner wall of the heater 103, a gas introducing portion 107 for introducing inert gas such as argon (Ar) gas or helium (He) gas into the inner space 108 from the lower portion of the furnace body 104, and a bottom cover 109. The bottom cover 109 has a hole (aperture) through which an optical fiber 106 is drawn to the outside of the furnace body 104.

The furnace tube 102 is made of, for example, carbon and is arranged in the inner wall of the furnace body 104 at a position at which the heater 103 is provided to prevent direct contact between the heater 103 and the optical fiber preform 105.

In the optical fiber drawing furnace 101, the optical fiber preform 105 is introduced into the inner space 108 of the furnace body 104, heated and melted by heat from the heater 103, and pulled down at a predetermined tension to form the optical fiber 106. The optical fiber 106 is extracted through the hole formed in the bottom cover 109.

Usually, the optical fiber preform 105 is heated and melted at around 2000° C. Thus, if the optical fiber 106 is formed in a normal atmosphere including oxygen, the carbon furnace tube 102 may be oxidized and damaged and dust may occur. The dust may lower the characteristics of the drawn optical fiber 106. The oxidization of the furnace tube 102 results in a shorter life of the furnace tube 102 and ends up raising the production costs of the optical fiber 106.

Therefore, the gas introduction portion 107 is provided at the lower portion of the furnace body 104 to introduce an inert gas such as argon (Ar) gas, nitrogen (Ni) gas, or helium (He) gas into the inner space 108 of the furnace body 104 so as to prevent entry of ambient gas, such as air, through the hole in the bottom cover 109. The pressure in the inner space 108 should be higher than the pressure of the ambient gas to prevent entry of ambient gas from the hole of the bottom cover 109. The inert gas introduced into the inner space 108 heads mainly to the top of the furnace body 104 and partially to the outside of the optical fiber drawing furnace through the hole of the bottom cover 109.

The hole in the bottom cover 109 must be a predetermined diameter so that the drawing optical fiber 106 can pass through it at a high speed without contacting the same. Accordingly, it is impossible to completely prevent entry of ambient gas through the hole of the bottom cover 109. To improve the extent to which entry of ambient gas is prevented, a higher pressure state of the inner space 108 and a larger amount of the introduction of the inert gas through the gas introduction portion 107 are necessary, but these lower the temperature in the inner space 108 and waste the inner gas, as discussed above.

Another related art will be described referring to FIG. 2.

An optical fiber drawing furnace 111 illustrated in FIG. 2 includes a furnace body 114, a heater 113, a furnace tube 112, a bottom cover 119 arranged at a bottom of the furnace body 114 and having a hole thorough which a drawing optical fiber 116 passes, and a gas introduction portion 117 provided at a lower portion of the furnace body 114 and immediately above the bottom cover 119. These structures are substantially identical to those in FIG. 1.

The optical fiber drawing furnace 111 illustrated in FIG. 2 further includes an additional gas introduction portion 120 at an upper portion of the furnace body 114 through which an optical fiber preform 115 is introduced into an inner space 118. Inert gas introduced through the additional gas introduction portion 120 prevents entry of the ambient gas to the inner space 118 from the top at which the optical fiber preform 115 is introduced into the inner space 118.

The inert gas is introduced into the inner space 118 through the gas introduction portion 117 to maintain a positive pressure state of the inner space with respect to the outside of the furnace 11 so as to prevent entry of the ambient gas into the inner space 118 through the hole of the bottom cover 119.

The optical fiber drawing furnace 111 suffers from the disadvantage of the entry of the ambient gas into the inner space 118 of the furnace body 114 through the hole in the bottom cover 119 due to the same reasons as to those described above with reference to FIG. 1. Thus, the optical fiber drawing furnace 111 still suffers from the disadvantages of the short life of the optical fiber drawing furnace 111, the low characteristics of the optical fiber 116, and the increased production cost of the optical fiber 116.

Japanese Examined Patent Publication (Kokai) No. 2-92838 discloses an optical fiber drawing furnace having a nozzle having a small diameter and a long length arranged immediately below a gas introduction portion provided at a lower portion of a furnace body and through which an optical fiber is drawn. The nozzle is provided to prevent entry of ambient gas into an inner space of the furnace body through the nozzle.

In practice, it is difficult to pass an optical fiber through such nozzle having a small diameter without contact when the drawing speed is high and the optical fiber vibrates in a transverse direction. In other words, such a optical fiber drawing furnace is not actually suitable to high speed drawing of the optical fiber. In addition to the above, a perfect seal against entry of ambient gas into the inner space of the furnace body cannot be achieved by such a nozzle without further reducing the diameter of the nozzle and further increasing the length of the nozzle. The narrower, longer nozzle may make production difficult and contact the drawn optical fiber.

Japanese Unexamined Utility Model Publication (Kokai) No. 59-153332, as shown in FIG. 3, discloses an optical fiber drawing furnace having two upper spaces 215 and 216 defined by two upper partitions 208 and 209 provided at an upper portion of a furnace body 201, through which an optical fiber preform 212 is introduced into an inner space 217, and a lower space 218 defined by lower partitions 210 and 211 provided at a bottom portion of the furnace body 201, through which an optical fiber 213 is drawn. In such optical fiber drawing furnace, inert gas is introduced into the inner space 217 through a lower gas introduction portion 204. The inert gas is also introduced into the lower-upper space 215 and the inner space 217 through an upper gas introduction portion 205. Further, inert gas is introduced into the lower space 218 through a lower gas introduction portion 206 to prevent entry of the ambient gas through a bottom hole provided in the lower partition 211. Inert gas is also introduced into the upper-upper space 216 through an upper gas introduction portion 207 to prevent entry of the ambient gas through a top hole provided in the upper partition 208.

The optical fiber drawing furnace disclosed in Japanese Unexamined Utility Model Publication (Kokai) No. 59-153332 discharges a large amount of inert gas into the atmosphere from the top and the bottom, therefore is uneconomical and contaminates the atmosphere. Further, such an optical fiber drawing furnace has a complex structure, is expensive, and requires difficult and troublesome maintenance work, therefore the production costs of the optical fiber become higher.

Japanese Examined Patent Publication (Kokoku) No. 7-84333 discloses an optical fiber drawing furnace wherein inert gas is introduced into an inner space of a furnace body at a top through which an optical fiber preform is inserted and the introduced inert gas is exhausted from a nozzle through which an optical fiber is drawn. The nozzle is provided with a suction chamber for adjusting an amount of gas to be exhausted through the nozzle to prevent entry of the ambient gas into the inner space of the furnace body.

The optical fiber drawing furnace disclosed in Japanese Examined Patent Publication (Kokoku) No. 7-84333 is aimed at the prevention of the contact of dust contained in the gas in the inner space to the optical fiber at the bottom nozzle through which the gas is exhausted so as to prevent the deterioration of the characteristics of the optical fiber. If the amount of the gas flowing from the inner space to the suction chamber is increased, the contact of dust and the optical fiber is increased and causes the deterioration of the characteristics of the optical fiber. There is a limitation to the increase of the suction gas flow, thus complete prevention of the entry of the ambient gas to the inner space is difficult.

The change of or variations in the diameter of the optical fiber preform may change the inner pressure of the inner space, but Japanese Examined Patent Publication (Kokoku) No. 7-84333 does not disclose or suggest any means of dealing with this. Such changes or variations may cause new disadvantages.

Japanese Unexamined Patent Publication (Kokai) No. 57-140330 discloses the idea of generating a gas flow at an upper portion and/or a lower portion in an optical fiber drawing furnace to prevent entry of the ambient gas into the inner space of the optical fiber drawing furnace. Japanese Unexamined Patent Publication (Kokai) No. 57-140330, however, merely discloses a technological idea and does not disclose or suggest control for determining a suitable value of sealing gas against variations in the inner pressure of the inner space due to the variations in a diameter of an optical fiber preform and/or variations in the drawing speed of an optical fiber. Accordingly, the technological idea disclosed in Japanese Unexamined Patent Publication (Kokai) No. 57-140330 cannot enable the generation of a gas flow for always preventing entry of the ambient gas into the inner space of the furnace body.

SUMMARY OF INVENTION

An object of the present invention is to provide an optical fiber drawing furnace capable of prevention of entry of an ambient gas into an inner space thereof, effectively and economical, under high speed drawing of an optical fiber.

According to the present invention, there is provided a furnace for forming an optical fiber comprising a furnace body elongated in a vertical direction and defining an inner space into which an optical fiber preform is introduced from the top of the furnace body; a heater for heating the optical fiber preform in the inner space to melt the optical fiber preform; a furnace tube arranged in the furnace body and inside of the heater for separating the heater and the optical fiber preform; an inert gas introduction portion arranged at a lower side wall of the furnace body and introducing inert gas into the inner space of the furnace body; a bottom gas entry preventing means provided at a bottom of the furnace body and having at least one hole through which a drawn optical fiber is passed; and a gas entry prevention controlling means for controlling a differential pressure between a first pressure in the inner space and a second pressure in the hole formed in the bottom gas entry preventing means to a predetermined value.

Preferably, the bottom gas entry preventing means comprises a first hole having a first cross-sectional area D1 and a first length L1 and positioned at a position below and close to the inert gas introduction portion, a second hole having a second cross-section area D2 and a second length L2, positioned at a position below the first hole, and spaced a predetermined distance from the first hole; and a chamber formed at a position between the first hole and the second hole. The first hole and the chamber are communicated, and the chamber and the second hole are communicated. The drawn optical fiber is passed through the first hole, the chamber, and the second hole, and the chamber is communicated to a gas evacuating means in the gas entry prevention controlling means.

More preferably, the first and second holes are formed to meet the following relationship:

$$\frac{L1}{D1} < \frac{L2}{D2}$$

Preferably, the gas entry prevention controlling means comprises a pressure sensor for detecting the differential pressure between the first pressure in the inner space and the second pressure in the chamber, a pipe connected to the chamber, a pump connected to the chamber through the pipe to evacuate the gas in the chamber, and a pressure control valve for controlling the differential pressure at a predetermined value.

More preferably, the differential pressure is within the range of 0.2 to 20 Pa.

The bottom gas entry preventing means may comprise a first partition having the first hole and a second partition having the second hole spaced from it by the predetermined distance. The chamber is defined by the first and second partitions and a side wall connecting the first and second partitions.

Alternatively, the bottom gas entry preventing means may comprise a block cover formed at the first and second partitions and the chamber.

Preferably, the bottom gas entry preventing means comprises a first hole having a first cross-sectional area D5 and a length L5 and positioned at a position below and close to the inert gas introduction portion, a second hole having a second cross-sectional area D6 and a length L6 and positioned at a position below the first hole, a chamber formed at around the circumferential portion and connected to a pipe of the outside of the furnace body, and a slit connecting the chamber and the second hole and having a downward inclination to an inner wall of the second hole and a width C. The gas entry prevention controlling means comprises a pressure sensor for detecting a differential pressure between the first pressure in the inner space and the second pressure in the first hole, and a pressure control valve for controlling the differential pressure at a predetermined value.

More preferably, the differential pressure is within the range of 0.2 to 20 Pa.

Still preferably, the angle of inclination of the slit is 5 to 20°.

Also, preferably, the width of the slit is 0.3 to 1.0 mm.

Preferably, the first cross-sectional area D5 is at least the second cross-sectional area D6.

Preferably, the bottom gas entry preventing means comprises a block cover formed at the first and second holes, the chamber, and the slit therein.

The furnace tube may be made of carbon.

The inert gas comprises any one of argon gas, helium gas, and nitrogen gas.

BRIEF DESCRIPTION OF THE DRAWINGS

The above and other objects and features of the present invention will be described more in detail with reference to the accompanying drawings, in which.

DESCRIPTION OF THE PREFERRED EMBODIMENTS

First Embodiment

Figure 4:
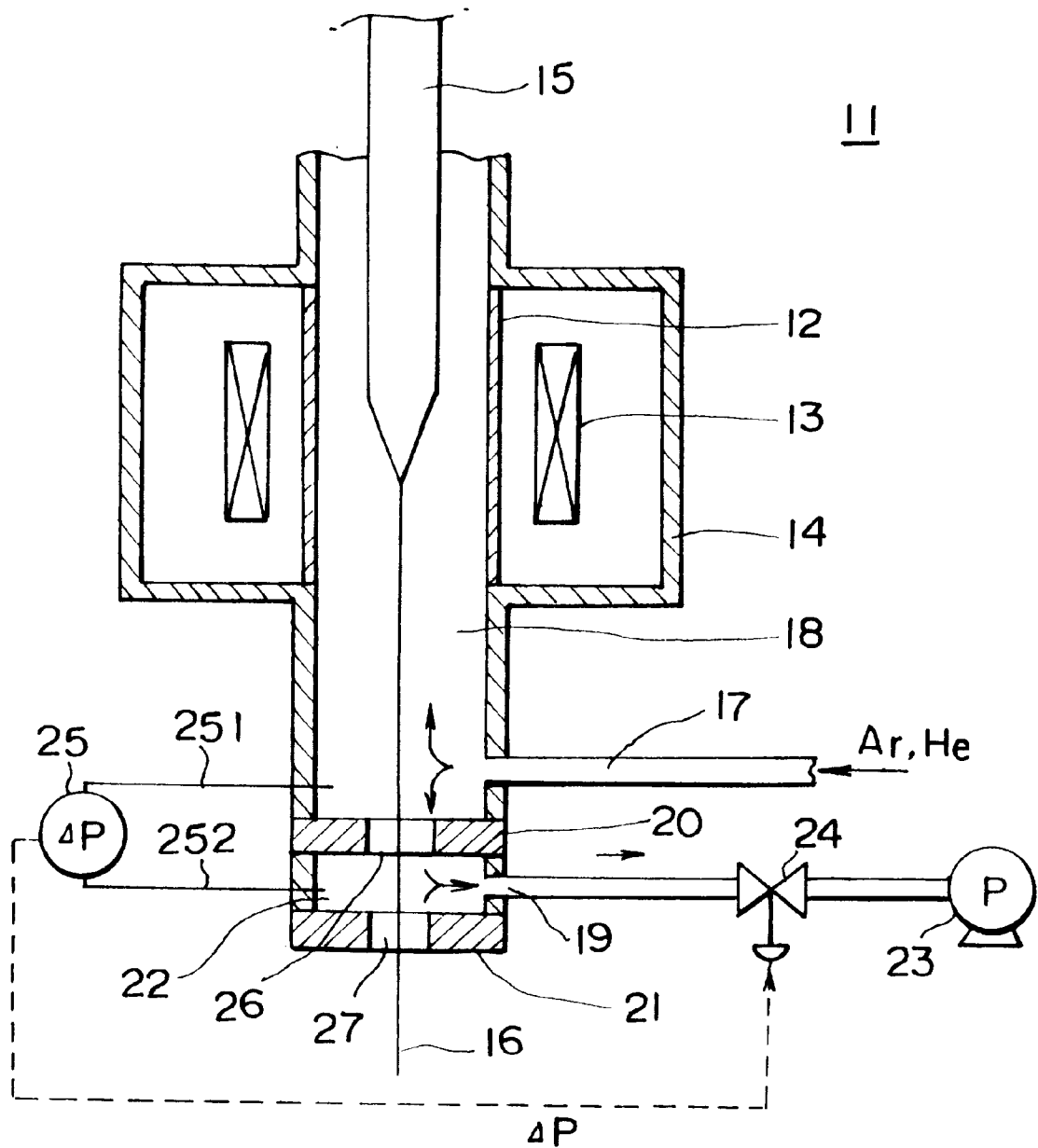
FIG. 4 is a sectional view of an optical fiber drawing furnace according to a first embodiment of the present invention.
Figure 5:
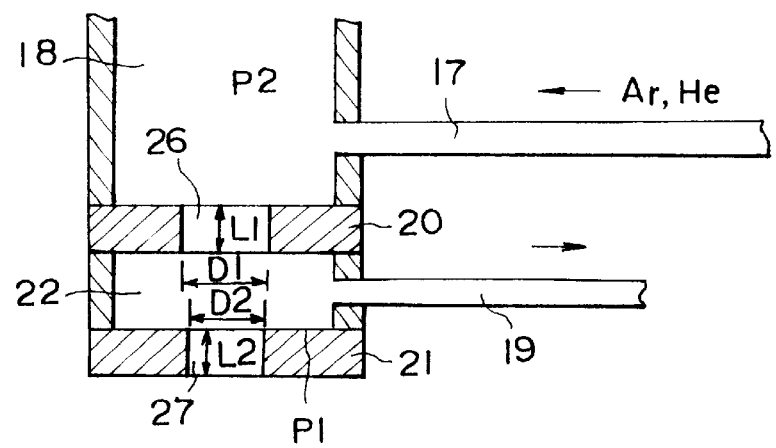
FIG. 5 is an enlarged view of a part shown in FIG. 4.

Referring to FIGS. 4 and 5, a first embodiment of an optical fiber drawing furnace according to the present invention will be described.

FIG. 4 is a sectional view of a first embodiment of an optical fiber drawing furnace according to the present invention, and FIG. 5 is an enlarged view of a part of the optical fiber drawing furnace illustrated in FIG. 4.

The optical fiber drawing furnace 11 illustrated in FIG. 4 includes a furnace body 14, a furnace tube 12 provided inside of the furnace body 14, a heater 13 provided between the furnace tube 12 and the furnace body 14, and a gas introduction portion (mouth) 17 provided at a lower portion of the furnace body 14. An inner space 18 is defined by the furnace body 14, the furnace tube 12, and a bottom cover described later.

The furnace tube 12 transfers the heat from the heater 13, and prevents direct contact of an optical fiber preform 15 and the heater 13. The furnace tube 12 is made of carbon.

The optical fiber drawing furnace shown in FIG. 4 is provided with a chamber 22 at a bottom of the furnace body 14, i.e., immediately below the gas introduction portion 17. The chamber 22 is defined by a partition (first partition) 20, a bottom cover (second partition) 21, and a wall as an extension of the furnace body 14. The partition 20 is provided with an upper opening (first lower hole) 26. The bottom cover 21 is also provided with a bottom opening (second lower hole) 27. The drawing optical fiber 16 passes through the openings 26 and 27, thus the openings 26 and 27 are coaxially formed.

The optical fiber drawing furnace 11 is provided with a first measurement port 251 formed by a tube and communicated at one end to the inner space 18 of the furnace body 14 and a second measurement port 252 formed by a tube and communicated at one end to the inside of the chamber 22. The optical fiber drawing furnace 11 is provided with a differential pressure meter 25 connected to the first and second measurement ports 251 and 252. The first measurement port 251 leads a gas in the inner space 18 to the differential pressure meter 25, and the second measurement port 252 leads a gas in the chamber 22 to the differential pressure meter 25, thus the differential pressure meter 25 defects a differential pressure ΔP between the pressures P1 and P2 in the inner space 18 and in the chamber 22, ΔP=P1−P2.

The optical fiber drawing furnace 11 is further provided with a pump 23, a pressure control valve 24, and a tube 19 connecting the inside of the chamber 22 and the pump 23.

The optical fiber preform 15 is inserted into the inner space 18 through the top opening of the furnace body 14 and heated and melted by the heat from the heater 13 provided inside of the furnace body 14. The melted optical fiber preform 15 is drawn below by a tension to form the optical fiber 16. The optical fiber 16 is passed through the openings 26 and 27 and drawn outside of the optical fiber drawing furnace 11.

The drawn optical fiber 16 consists of, for example, a core having a diameter of 10 μm and a cladding formed on the core and having a diameter of 125 μm. The drawn optical fiber 16 may be coated by a resin on its outer circumference.

Normally, the optical fiber preform 15 is heated at approximately 2000° C. to be melted for drawing. Of course, the heating temperature depends on the material of the optical fiber preform 15. the diameter of the optical fiber preform 15, the diameter of the optical fiber 16, etc. A high temperature damages the furnace tube 12.

To prevent rapid oxidization of the furnace tube 12 and the resultant damage of the same, the entry of dust into the inner space 18 must be prevented. The dust deteriorates the quality and the characteristics of the optical fiber 16.

During the drawing of the optical fiber 16, the introduction of inert gas such as argon (Ar) gas, nitrogen (Ni) gas, or helium (He) gas into the inner space 18 through the gas introduction portion 17 contributes to the prevention of the entry of the ambient gas into the inner space 18. Further, in the first embodiment, the differential pressure meter 25 detects the differential pressure ΔP between the pressure P1 in the inner space 18 and the pressure P2 in the chamber 22. The pressure control valve 24 reads the differential pressure ΔP and controls a suction flow of the pump 23 to evacuate the gas in the chamber 22 outside of the chamber 22 so as to maintain the differential pressure ΔP at a predetermined value and a state where P1>P2. The condition of keeping the pressure P1 in the inner space 18 at a positive pressure to the pressure P2 in the chamber (P1>P2) is absolutely required to prevent the entry of the gas into the inner space 18.

The gas introduction portion 17 is arranged at a lower (bottom) position of the furnace body 14, thus the introduced gas mainly heads the top of the furnace body 14 and is evacuated from there. A part of the introduced gas heads downward when P1>P2.

The first opening 26 communicates the inner space 18 and the chamber 22, and the second opening 27 communicates the chamber 22 and the outside of the optical fiber drawing furnace 11.

Considering sizes of the first (lower) opening 26 and the second (bottom) opening 27, the sizes should be in the following relationship:

$$(L1/D1) < (L2/D2) \quad (1)$$

where,

L1 is a length of the first opening 26,
D1 is a diameter of the first opening 26,
L2 is a length of the second opening 27, and
D2 is a diameter of the second opening 27

The requirement of the above relationship 1 will be considered next.

When L1=L2, and D1>D2, namely, when the inner diameter D1 of the first opening 26 is greater than the inner diameter D2 of the second opening 27 and the pump 26 evacuates the gas in the chamber 22 through the tube 19, the flow of the gas in the inner space 18 evacuated through the first opening 26 is greater than the ambient gas introduced into the chamber 22 through the second opening 27. Consequently, it is possible to prevent the entry of the ambient gas into the inner space 18.

Alternately, when D1=D2 and the length L1 of the first opening 26 is shorter than the length 22 of the second opening 27, the long opening makes entry of gas therethrough difficult while the short opening facilitates the passage of gas therethrough. Consequently, the first opening 26 enables a larger flow of the gas from the inner space 18 to the chamber 22 through the first opening 26 than the gas flow from the outside to the chamber 22 through the second opening 27. As a result, prevention of the entry of the gas from the outside into the inner space 18 can be achieved.

In this way, the chamber 22, the controller 24, and the pump 23 function as a pressure control (adjustment) means or a gas sealing means for sealing the inner space 18 against the entry of the ambient gas. Of course, introduction of inert gas into the inner space from the gas introduction portion 17 immediately above the chamber 22 is needed. As discussed above, by keeping the condition of P1>P2, namely, by keeping a positive pressure state of the inner space 18 to the outside of the optical fiber drawing furnace 11, the entry of the ambient air through the openings 26 and 27 into the inner space 18 is difficult even if the optical fiber 16 is passed through the openings 26 and 27.

To suitably control the amount of inert gas introduced into the inner space 18 through the gas introduction portion 17 and to suitably maintain the gas pressure in the inner space 18, the differential pressure meter 25 measures (detects) the differential pressure ΔP between the pressure P1 in the inner space 18 and the pressure P2 in the chamber 22, ΔP=P1−P2, and the pressure control valve 24 reads the differential pressure ΔP from the differential pressure meter 25 and controls the suction flow of the pump 23 to maintain the differential pressure ΔP at a predetermined value in response to the read differential pressure ΔP.

Maintaining the differential pressure ΔP at a predetermined constant value is not an absolute condition for the prevention of the entry of the ambient gas, but is preferable, because when the gas flow introduced into the inner space 18 is maintained at a constant value, stable drawing of the optical fiber 16 can be carried out.

Preferably, the differential pressure ΔP (ΔP=P1−P2) is 0.2 to 20 Pa, more preferably 0.5 to 2 Pa. When the differential pressure ΔP becomes lower than 0.2 Pa, the pressure control or the gas flow control of the pressure control valve 24 is susceptible to outside disturbance, thus control for keeping the condition of P1>P2 is difficult. On the other hand, when the differential pressure ΔP becomes higher than 20 Pa, the ambient gas may enter the inner space 18 from the top of the optical fiber drawing furnace 11, and the abrupt suction of the ambient gas into the inner space 18 from the top causes the vibration of the optical fiber in the inner space 18. Experience shows that the best range of the differential pressure ΔP is 0.5 to 2 Pa.

In the present embodiment, the pressure control valve 24 controls the suction flow of the pump 23 to maintain the differential pressure ΔP detected by the differential pressure meter 25 within the range of 0.5 to 2 Pa, preferably at 1 Pa as a reference (target) value.

As described above, the provision of the chamber 22 defined by the partition 20 and the bottom cover 21, the pressure control valve 24, the differential pressure meter 25, and the pump 23, in addition to the provision of the gas introduction portion, the condition of the sizes of the openings 26 and 27 defined in formula 1, and the control of the differential pressure ΔP at a predetermined range, prevents the entry of the ambient gas into the inner space 18 of the optical fiber drawing furnace 11 and enables a high quality of the optical fiber 16 at high speed drawing.

The optical fiber drawing furnace 11 of the embodiment does not suffer from the rapid oxidization by the ambient gas and rapid damage and can operate for a long time even when the optical fiber 16 is drawn at a high speed.

EXPERIMENTAL EXAMPLE

An experiment conducted using the optical fiber drawing furnace 11 illustrated in FIGS. 4 and 5 under the following conditions and a first comparative example using the optical fiber drawing furnace illustrated in FIG. 1 will be described next.

TABLE 1

| First opening 26 | Second opening 27 |
|---|---|
| D1 = 10 mm | D2 = 5 mm |
| L1 = 10 mm | L2 = 10 mm |

Therefore, the following relation is satisfied:

$$(L1/D1=1.0) < (L2/D2=2.0)$$

The optical fiber drawing furnace 11 was operated under the following conditions:

TABLE 2

| | |
|---|---|
| Outer diameter of optical fiber preform | 100 mm |
| Drawing speed of optical fiber 16 | 1000 m/min |
| Temperature of inner space 18 | 2200° C. |
| Inert gas flow introduced through gas introduction portion 17 | |
| Ar gas | 5 liter/min |
| He gas | 10 liter/min |
| Control of differential pressure ΔP | Approx. 1 Pa |
| Suction flow by pump 23 | 3 to 4 liter/min |

In the experiment using the optical fiber drawing furnace 11 shown in FIG. 4, although the value (D1/L1) was a half of the value (D2/L2) and the suction flow by the pump 23 was a small 2 to 4 liter/min, the pressure P1 in the inner space 18 was always higher than the pressure P2 in the chamber 22. As a result, the entry of the ambient gas into the inner space 18 was prevented.

The average breakage of the resultant optical fiber 16 was once in 150 km. The average life of the furnace tube 12 was 2 weeks.

Further, an experiment was conducted for an optical fiber preform 15 having outer diameter varied in the range of 95 to 110 mm while the differential pressure ΔP was controlled to around 1 Pa. As a result, an optical fiber 16 having a high quality was produced.

First Comparative Example

Figure 1:
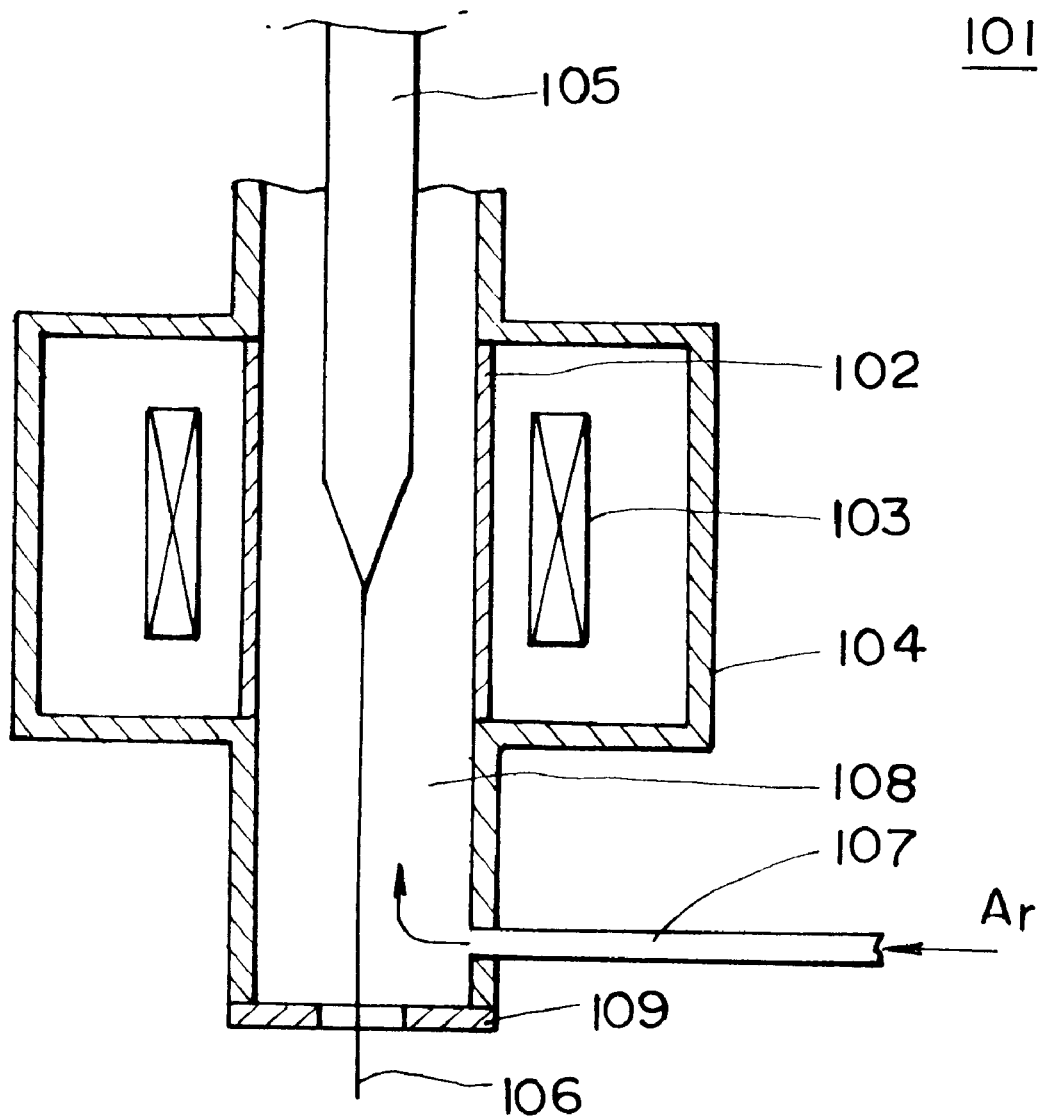
FIG. 1 is a sectional view of an optical fiber drawing furnace of the related art.

The optical fiber preform 105 was heated, melted, and drawn in the optical fiber drawing furnace 101 shown in FIG. 1 under the following conditions to produce the optical fiber 106.

TABLE 3

| | |
|---|---|
| Outer diameter of optical fiber preform 105 | 100 mm |
| Drawing speed | 1000 m/min |
| Temperature in inner space 108 | 2200° C. |
| Inert gas introduced into inner space | |
| Ar gas | 5 liter/min |
| He gas | 10 liter/min |

The differential pressure was −1 Pa, namely, the pressure in the inner space 108 was lower than the pressure of the outside of the furnace, so the ambient air entered into the inner space 108. As a result, the average breakage of the resultant optical fiber 106 was once per 70 km. The average life of the furnace tube 102 was a few days.

Comparing the experiment of the first embodiment and the comparative example, the experiment of the embodiment showed that the average breakage length of the optical fiber could be doubled and the average lifetime of the furnace tube could be extended four-fold.

A further comparative example was carried out under the following conditions:

TABLE 4

| Inert gas introduced into inner space 108 | |
|---|---|
| Ar gas | 10 liter/min |
| He gas | 10 liter/min |

Namely, the flow of the Ar gas was increased from 5 liter/min to 10 liter/min. As a result, the pressure of the inner space 108 became higher than the outside pressure. It was however necessary to raise the temperature in the inner space 108 from 2200° C. to 2250° C. This raise of the temperature increased the damage of the furnace tube and lowered the characteristics of the optical fiber. The average life of the furnace tube 102 was one week, and the average breakage of the optical fiber was once per 100 km.

As described above, the present embodiment can effectively prevent the entry of the ambient gas into the inner space of the optical fiber drawing furnace without the increase of the introduction of inert gas or a rise of the temperature by the heater. Namely, the present embodiment can produce an optical fiber having a high quality, a high yield, and a low cost. The present embodiment can also extend the life of the furnace tube, thus eases the maintenance work and reduces the cost.

Second Embodiment

Figure 6:
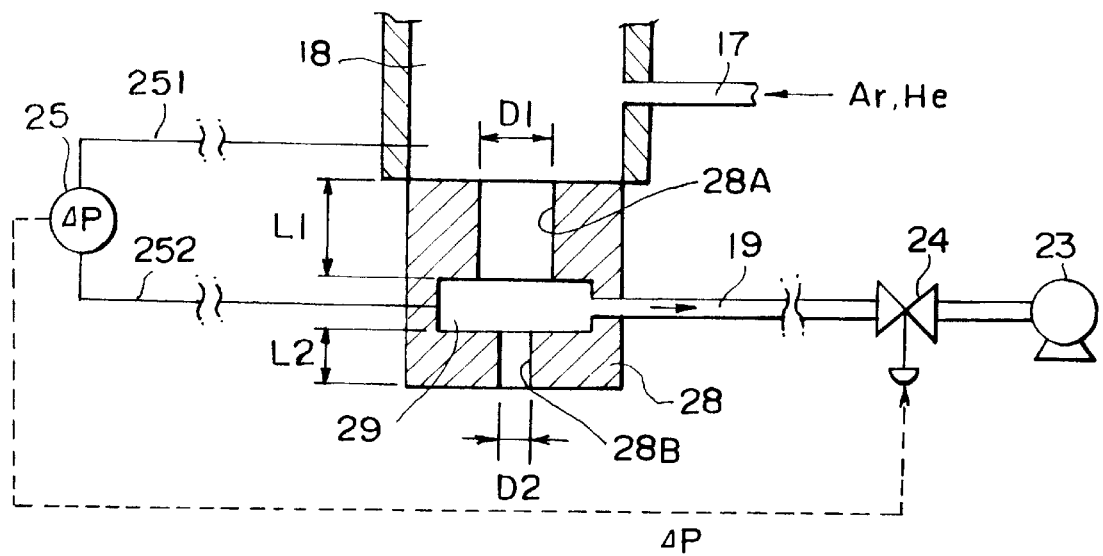
FIG. 6 is a sectional view of a part of an optical fiber drawing furnace according to a second embodiment of the present invention.

Referring to FIG. 6, a second embodiment of an optical fiber drawing furnace according to the present invention will be described next.

FIG. 6 is a sectional view of a part of the optical fiber drawing furnace. The fundamental structure of the optical fiber drawing furnace not shown in FIG. 6 is substantially the same as that shown in FIGS. 4 and 5.

The optical fiber drawing furnace 11A is provided with a bottom block cover 28. A chamber 29 is defined (formed) in the bottom block cover 28. An upper (first) opening (hole) 28A having an inner diameter D1 and a length L1 is formed in the bottom block cover 28 to communicate the inner space 18 of the furnace body 14 and the chamber 29. A lower (second) opening (hole) 28B having an inner diameter D2 and a length L2 is also formed in the bottom cover 28 to communicate the chamber 29 and the outside of the optical fiber drawing furnace 11A. A drawn optical fiber is passed through the upper and lower openings 28A and 28B.

The side wall of the chamber 29 is provided with a hole connected to the gas suction tube 19 for evacuating gas in the chamber 29 by the pump 23.

The differential pressure meter 25 detects the differential pressure ΔP between the pressure P1 in the inner space 18 of the furnace body 14 and the pressure P2 in the chamber 29, i.e., ΔP=P1−P2.

The pressure control valve 24 controls the suction flow by the pump 23 to maintain the differential pressure ΔP at a predetermined value.

In the optical fiber drawing furnace having the bottom block cover 28 including the chamber 29, the relation of the sizes of the openings 28A and 28B should satisfy the relation 1. For example, if D1=15 mm, L1=25 mm, D2=5 mm, and L2=10 mm, then, (25/15)<(10/5). A diameter D2 of the lower opening 28B smaller than the diameter D1 of the upper opening 28A makes the entry of the ambient gas to the chamber 29 more difficult than that of the inert gas in the inner space 29 to the chamber 29.

An experiment conducted using the optical fiber drawing furnace shown in FIG. 6 gave results substantially equal to the results of the optical fiber drawing furnace of the first embodiment. Namely, the resultant optical fiber showed a sufficient strength without breakage and a high quality. The furnace tube had a long life.

Third Embodiment

Figure 7:
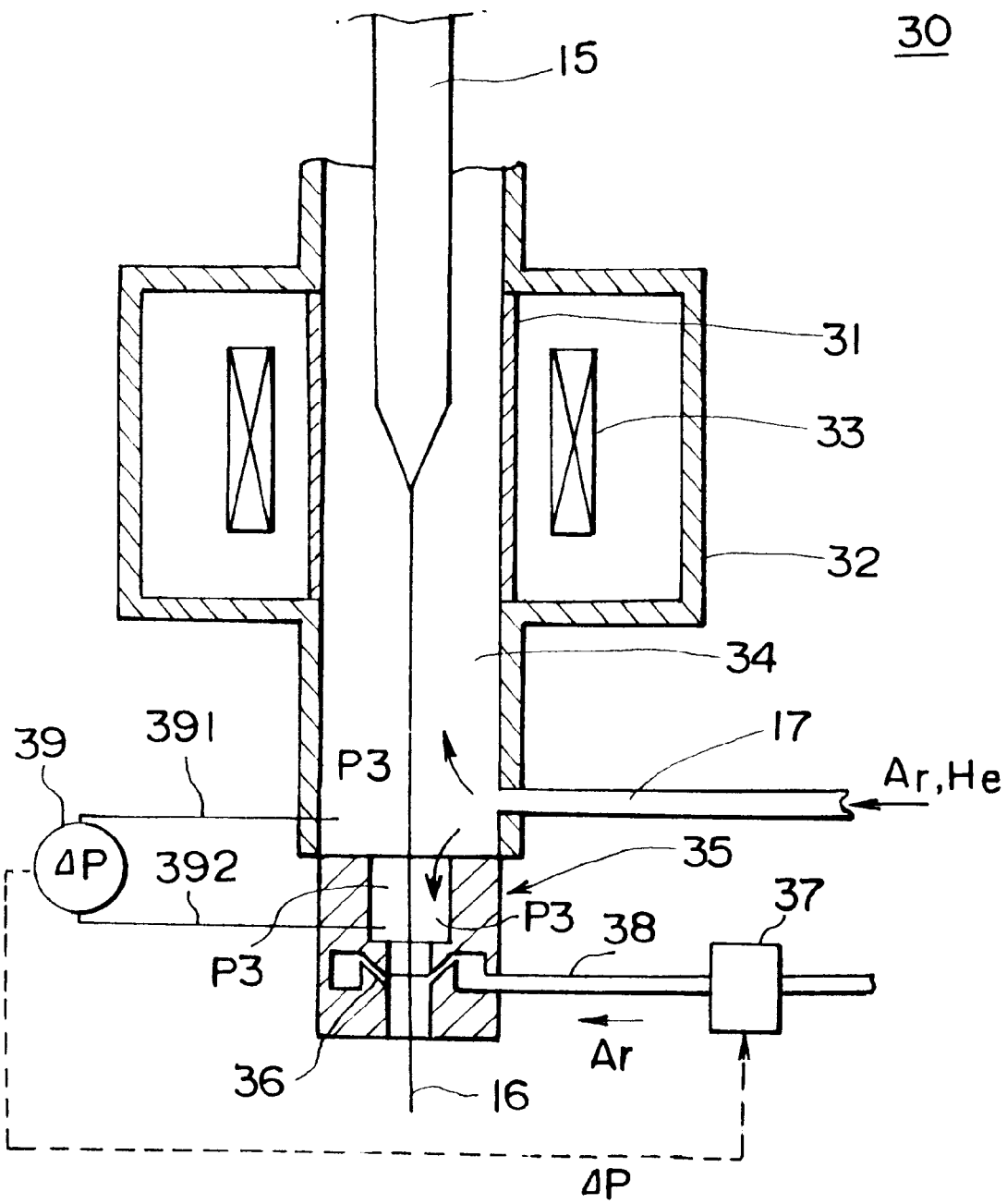
FIG. 7 is a sectional view of an optical fiber drawing furnace according to a third embodiment of the present invention.
Figure 8:
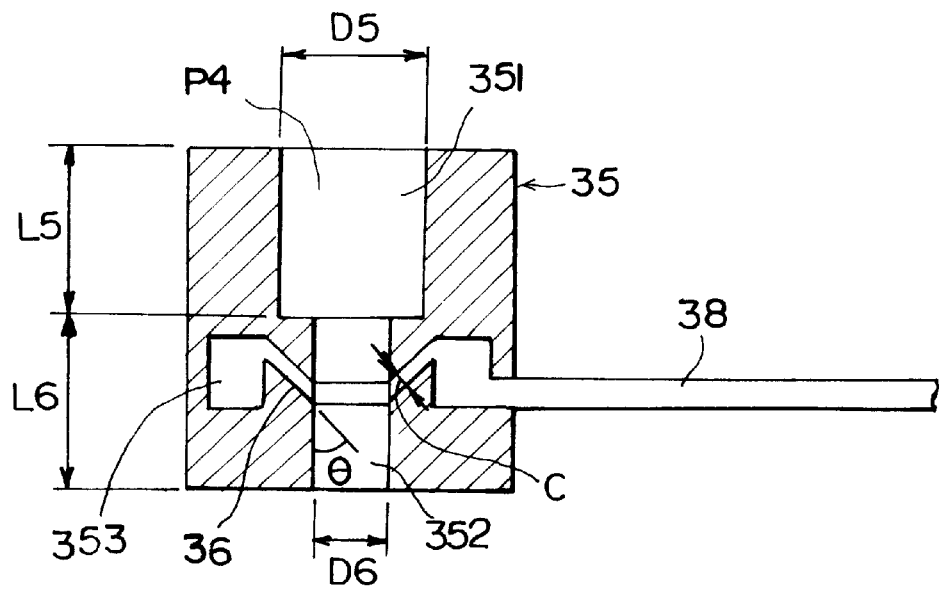
FIG. 8 is an enlarged view of a part of the optical fiber drawing furnace shown in FIG. 7.

Referring to FIGS. 7 and 8, a third embodiment of an optical fiber drawing furnace according to the present invention will be described next.

FIG. 7 is a sectional view of the optical fiber drawing furnace of the third embodiment, while FIG. 8 is an enlarged sectional view of a part of the optical fiber drawing furnace shown in FIG. 7.

The optical fiber drawing furnace 30 consists of a furnace body 32, a heater 33, a furnace tube 31, and a gas introduction portion 17. The structure given by these components is substantially equal to the structure of the optical fiber drawing furnace shown in FIGS. 4 to 6.

The optical fiber drawing furnace 30 also consists of a bottom block cover 35, a pipe 38, a gas flow controller 37, a differential pressure meter 39, and measurement ports (pipes) 391 and 392.

The bottom block cover 35 consists of, as shown in FIG. 8, a first opening (first follow portion) 351 having an inner diameter D5 and a length L5, a second opening (second follow portion) 352 having an inner diameter D6 and a length L6, a bore (a small chamber) 353 arranged at an outer circumferential portion of the second opening 352, and a slit (hole) 36 connecting the second opening and the bore 353. The slit 36 is inclined downward by an angle θ to the inner wall of the second opening 352. The bore 353 is connected to the tube 38 by a through hole formed in the side wall of the bottom block cover 35.

The first opening 351 communicates an inner space 34 defined in the furnace body 32 and the second opening 352. The second opening 352 communicates the first opening 351 and the outside of the optical fiber drawing furnace. A drawn optical fiber 16 is passed through the first and second (upper and lower) openings 351 and 352.

The optical fiber preform 15 is introduced into the inner space 34 of the furnace body 32 from the top of the optical fiber drawing furnace 30, is heated and melted by the heat from the heater 33, and then pulled down at a predetermined tension. The resultant optical fiber 16 is drawn through the openings 351 and 352.

During the drawing of the optical fiber 16, inert gas such as Ar gas, He gas, and/or N gas is introduced into the inner space 34 of the furnace body 32 through the gas introduction portion 17. The introduced inert gas heads mainly upward in the inner space 34.

The gas such as clean air or inert gas is sent to the bore 353 at a predetermined pressure through the pipe 38. The pressurized gas in the bore 353 passes through the slit 36 having a smaller sectional area to the second opening 352. The pressurized gas introduced into the second opening 352 heads downward by the inclined angle θ of the slit 36, i.e., the outside of the bottom block cover 35 which is positioned at a bottom of the optical fiber drawing furnace 30. Namely, the gas introduced into the second opening 352 is evacuated to the outside of the optical fiber drawing furnace 30.

The above gas stream (flow) causes a negative pressure condition in the first opening 351 to the inner space 34 of the furnace body 32 to make a flow of the inert gas introduced into the inner space 34 through the gas introduction portion 17 head downward. The inert gas heading downward is introduced into the first opening 351, passed through the second opening 352, and evacuated to the outside of the bottom block cover 35 together with the pressurized gas. Consequently, entry of ambient gas such as air into the inner space 34 through the openings 352 and 351 can be prevented.

To ensure the prevention of the entry of the ambient gas into the inner space 34 of the furnace body 32, the inner diameter D5 of the first opening 351 should be larger than the inner diameter D6 of the second opening 352.

The pressure P3 in the inner space 34 should be kept higher than the pressure P4 in the first opening 351. To effectively prevent the entry of the ambient gas into the inner space 34, the differential pressure ΔP between the pressures P3 and P4, i.e., ΔP=P3−P4, should be kept at a suitable range. Experiments showed that the differential pressure ΔP should be 0.2 to 20 Pa, more preferably, 0.5 to 2 Pa, for reasons the same as discussed above.

The differential pressure meter 39 detects the differential pressure ΔP by introducing the gases through the measurement ports 391 and 392. The controller 37 reads the differential pressure ΔP from the differential pressure meter 39 and controls the gas flow to maintain the differential pressure ΔP at a desired value.

EXPERIMENTAL EXAMPLE

An experiment of the third embodiment was carried out under the following conditions:

TABLE 5

| | |
|---|---|
| Diameter D5 | 15 mm |
| Length L5 | 30 mm |
| Diameter D6 | 5 mm |
| Length L6 | 20 mm |
| Gas | Ar gas, 4 liter/min |
| Inclined angle θ of slit 36 | 15° |
| Width of slit 36 | 0.5 mm |
| Diameter of optical fiber preform | 100 mm |
| Drawing speed | 1000 m/min |
| Temperature in inner space 34 | 2200° C. |

TABLE 5-continued

| Inert gas introduced through portion 17 | |
| --- | --- |
| Ar gas | 5 liter/min |
| He gas | 10 liter/min |

The controller 37 controlled the gas flow through the slit 36 and control the differential pressure ΔP at a desired value. In the above example, when the gas flow was 4 liter/min, the differential pressure ΔP was maintained at around 1 Pa. The ambient air did not enter into the inner space 34. The optical fiber having the desired characteristics was therefore produced. The average breakage of the optical fiber was once per 160 km. The average life of the furnace tube 31 was two weeks.

The inclined angle θ of the slit 36 should be small as small as possible from the viewpoint of the generation of a large differential pressure ΔP, but a small inclined angle θ results in vibration of the optical fiber 16. Experiments showed the preferred inclined angle θ was 5 to 20°. In the above example, θ=15°.

The width C of the slit 36 should be 0.3 to 1.0 mm. When the width C is too narrow, the gas flow through the slit 36 becomes too fast, while a too wide width C requires a large gas flow, namely a lot of the gas may be wasted. In the above experiment, C=0.5 mm.

In the above example, the gas flow was 4 liter/min. The gas flow can be varied on the basis of the diameter of the optical fiber preform 15, the drawing speed, the volumes of the first and second openings 28A and 28B, the volume of the bore 353, and other factors, however.

Second Comparative Example

Figure 2:
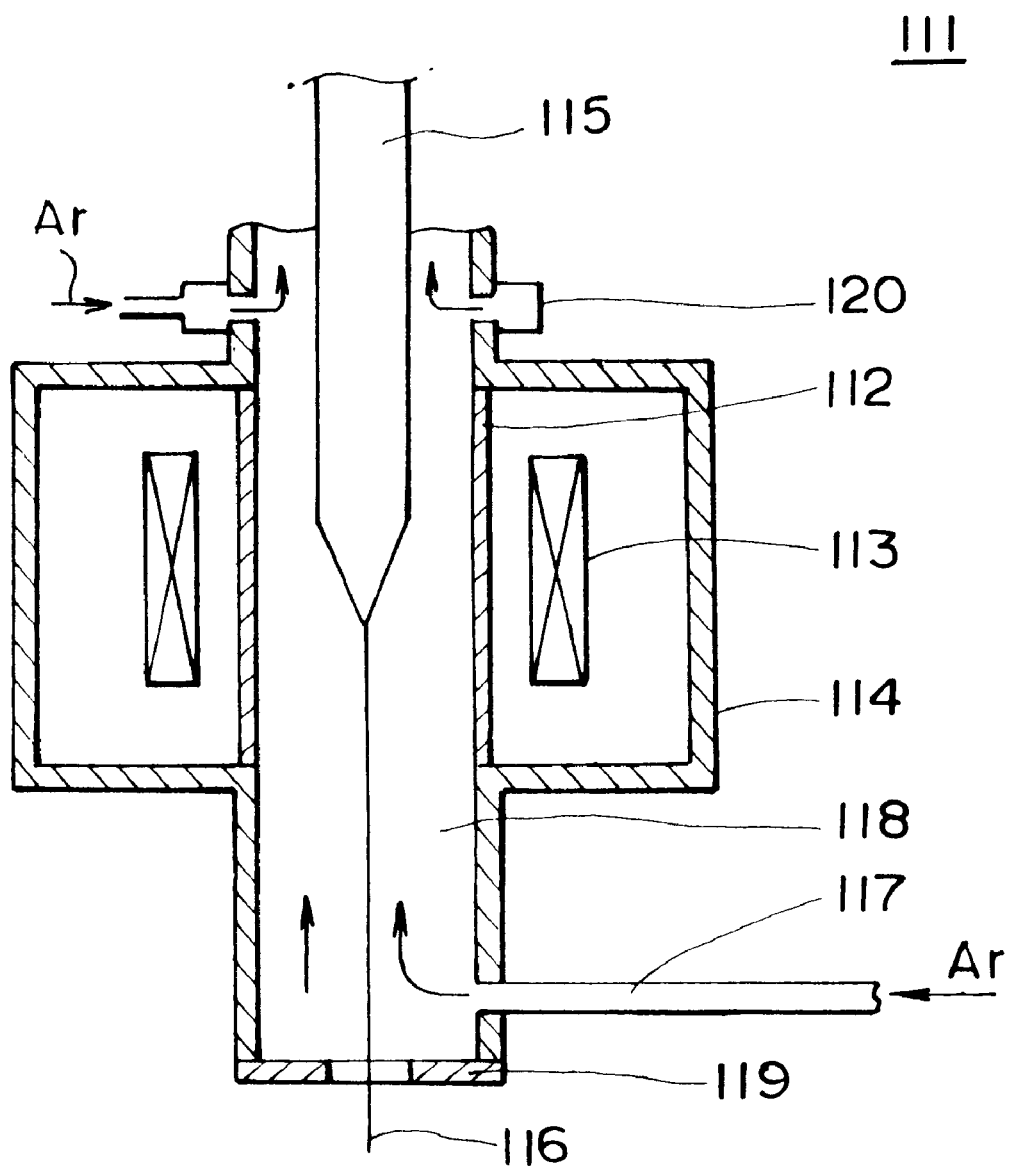
FIG. 2 is a sectional view of an optical fiber drawing furnace of another related art.
Figure 3:
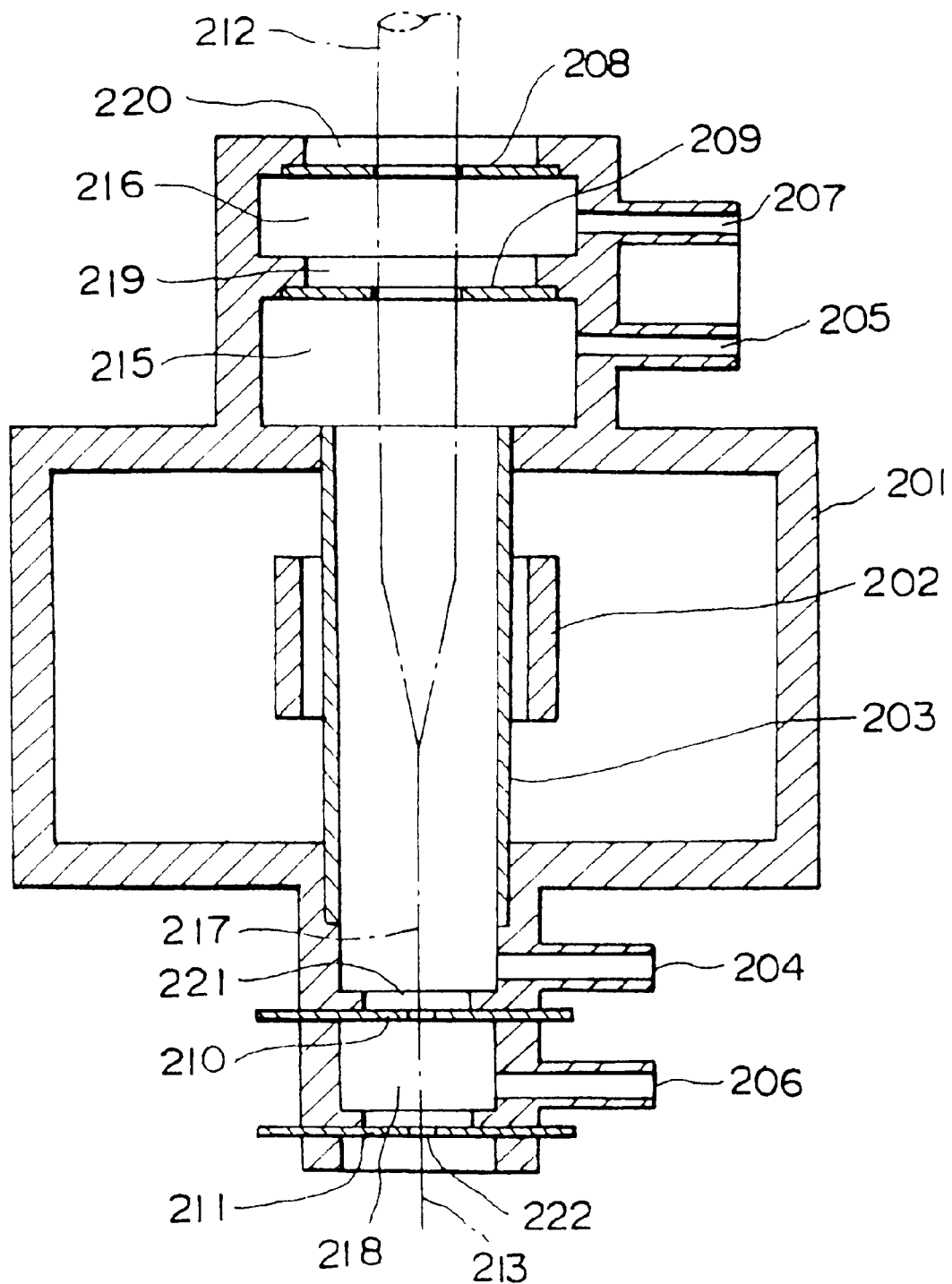
FIG. 3 is a sectional view of an optical fiber drawing furnace of still another related art.

As a second comparative example, the optical fiber drawing furnace 111 shown in FIG. 2 was used to draw an optical fiber preform 115 under the following conditions:

TABLE 6

| Diameter of optical fiber preform 115 | 100 mm |
| --- | --- |
| Drawing speed | 1000 m/min |
| Temperature in inner space 118 | 2200° C. |
| Inert gas introduced into inner space 118 | |
| Ar gas | 5 liter/min |
| He gas | 10 liter/min |
| Gas flow at gas introduction portion 120 | |
| Ar gas | 20 liter/min |

The differential pressure ΔP was −1 Pa, so the ambient gas entered into the inner space 118 to oxidize the furnace tube 112. The average breakage of the resultant optical fiber was once per 70 km, and the average life of the furnace tube 112 was approximately 3 days.

When the inert gas was increased to make the flow of the Ar gas 10 liter/min and the flow of the He gas 10 liter/min, the differential pressure ΔP became a positive pressure, which meant the prevention of the entry of the ambient gas into the inner space 118, but it was necessary to raise the temperature in the inner space 118 from 2200° C. to 2250° C. The rise of the temperature promoted the oxidization of the furnace tube 112 to shorten the life of the tube. The average life of the furnace tube 112 was 1 week, and the average breakage of the resultant optical fiber was once per 100 km.

As described above, the third embodiment prevents the entry of the ambient gas into the inner space of the optical fiber drawing furnace. As a result, the average life of the furnace tube was extended. The average breakage of the resultant optical fiber was improved as well.

Fourth Embodiment

Figure 9:
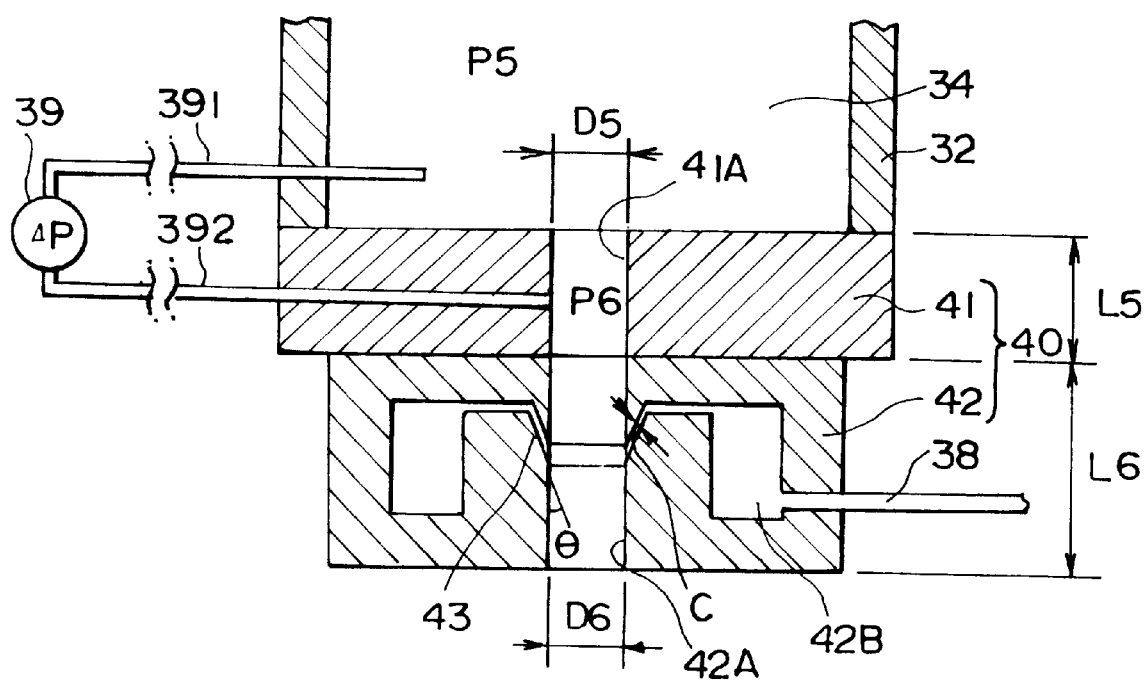
FIG. 9 is a sectional view of a part of an optical fiber drawing furnace according to a fourth embodiment of the present invention.

Referring to FIG. 9, a fourth embodiment of an optical fiber drawing furnace according to the present invention will be described.

FIG. 9 is an enlarged sectional view of a part of the optical fiber drawing furnace.

The optical fiber drawing furnace of the fourth embodiment has a bottom block cover 40 shown in FIG. 9 corresponding to that of FIG. 8. The rest of the components are substantially equal to those in FIG. 7.

The bottom block cover 40 consists of a partition 41 and a nozzle 42.

The partition 41 forms a bottom of the furnace body 32 of the optical fiber drawing furnace 30 shown in FIG. 7 and is provided with a first hole (opening) 41A having a diameter D5 and a length L5.

The nozzle 42 has a second hole 42A having a diameter D6 and a length L6, a bore (chamber) 42B formed at a circumferential portion of the second hole 42A, and a slit 43 connecting the second hole 42A and the chamber 42B. The slit 43 is inclined by an angle θ to the inner wall of the second hole 42A and has a width C. The pipe 38 communicates to the chamber 42B through a through hole provided in the side wall of the nozzle 42.

The pipe 38 is connected to the controller 37.

The controller 37 controls the gas flow in response to the differential pressure ΔP detected by the differential pressure meter 39.

The slit 43 has a narrow slit shape between conical trapezoidal surfaces.

The differential pressure ΔP between the pressure P5 in the inner space 34 and the P6 in the first hole 41A, i.e., ΔP=P5−P6, can be adjusted by adjusting the gas flow through the slit 43.

EXPERIMENTAL EXAMPLE

An experiment was conducted under the following conditions:

TABLE 7

| Diameter D5 | 6 mm |
| --- | --- |
| Length L5 | 21 mm |
| Diameter D6 | 6 mm |
| Length L6 | 20 mm |
| Gas flow | Inert gas such as Ar gas and N₂ gas |
| Width C of slit 43 | 0.3 mm |
| Inclined angle θ | 10° |

By adjusting the gas flow between 2 and 4 liter/min by the controller 37, the differential pressure ΔP was +1 Pa. The entry of the ambient gas was therefore prevented.

Fifth Embodiment

Figure 10A:
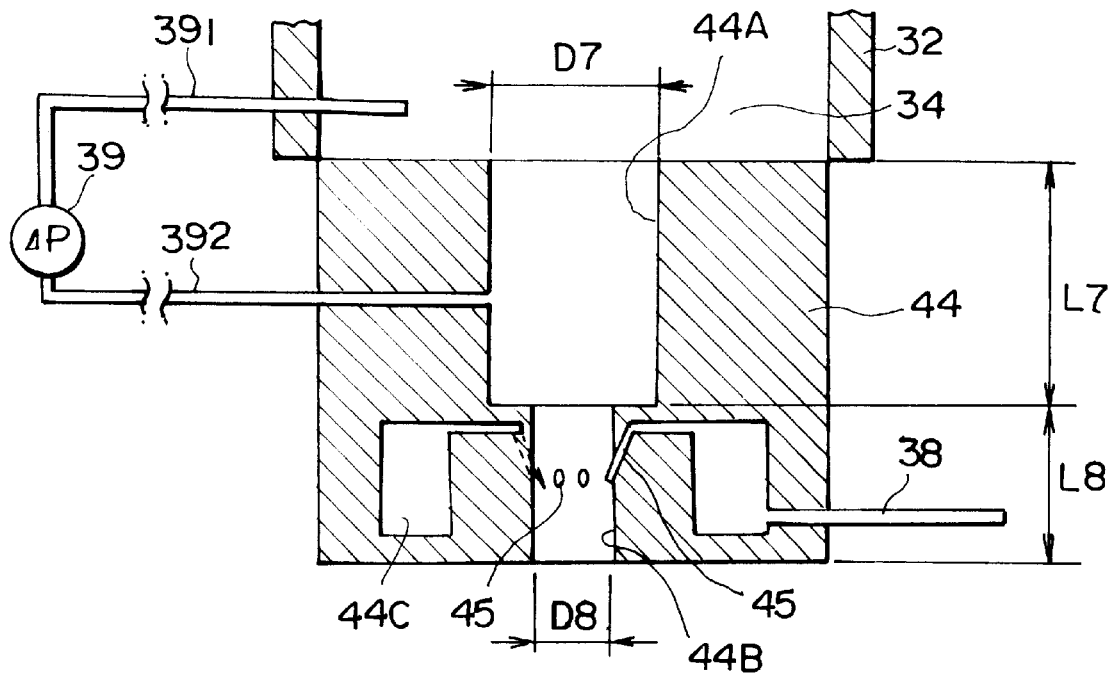
FIGS. 10A and 10B are views of an optical fiber drawing furnace according to a fifth embodiment of the present invention.
Figure 10B:
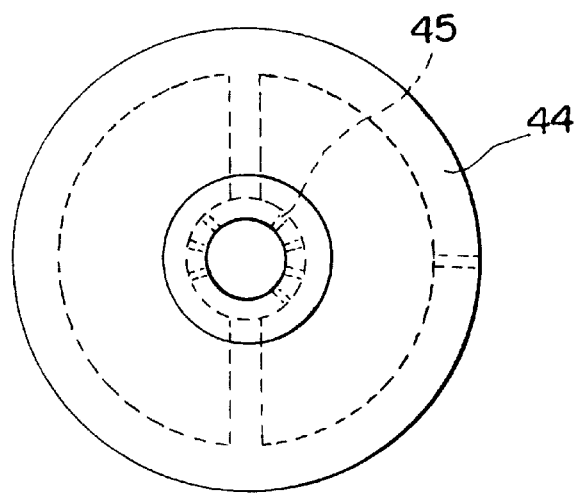

Referring to FIGS. 10A and 10B, a fifth embodiment of an optical fiber drawing furnace according to the present invention will be described next.

FIG. 10A is an enlarged sectional view of a part of the optical fiber drawing furnace, while FIG. 10B is a cross-sectional view of the part taken along a line X—X in FIG. 10A.

The optical fiber drawing furnace of the fifth embodiment has a bottom block cover 44 corresponding to that of FIG. 8. The rest of the components are substantially equal to those in FIG. 7.

The bottom block cover 44 consists of a first hole (opening) 44A having a diameter D7 and a length L7, a second hole (opening) 44B having a diameter D8 and a length L8, a bore (chamber) 44C formed around the second hole 44B, and a slit (small hole) 45 having an angle θ inclined to the inner wall of the second hole 44B and a plurality of small holes. The bore 44C is communicated to the pipe 38 by a through hole provided in the side wall of the bottom block cover 44.

An experiment was conducted under the following conditions:

TABLE 8

| | |
|---|---|
| Diameter D7 | 15 mm |
| Length L7 | 30 mm |
| Diameter D8 | 5 mm |
| Length L8 | 20 mm |
| Slit 45 | |
| inclined angle θ | 15° |
| No. of small holes | 8 |
| Each diameter | 1 mm |

The rest of the conditions were same as those shown in Table 7.

By suitably adjusting the gas flow and the controller 37, the differential pressure ΔP was suitably maintained such as +1 Pa. The entry of the ambient gas was therefore prevented.

Other modifications and changes in the present invention can be adopted within the scope of the claims of the present invention.

Summarizing the effects of the invention, according to the present invention, an optical fiber having desired characteristics and free from short breakage can be produced, the life of the furnace tube can be extended, and, as a result, the yield of the optical fiber can be improved, the production costs can be lowered, and the maintenance work can be facilitated.

What is claimed is:

1. A furnace for forming an optical fiber, comprising:
   a furnace body elongated in a vertical direction and defining an inner space into which an optical fiber preform is introduced from a top of the furnace body;
   a heater for heating the optical fiber preform in the inner space to melt the optical fiber preform;
   a furnace tube arranged in the furnace body and inside of the heater for separating the heater and the optical fiber preform;
   an inert gas introduction portion arranged at a lower side wall of the furnace body and introducing inert gas into the inner space of the furnace body;
   a bottom gas entry preventing means provided at a bottom of the furnace body and having at least one hole through which a drawn optical fiber is passed; and
   a gas entry prevention controlling means for controlling a differential pressure between a first pressure in the inner space and a second pressure in a chamber formed beneath a first hole formed in the bottom gas entry preventing means to a predetermined value.

2. A furnace for forming an optical fiber according to claim 1, wherein the bottom gas entry preventing means comprises:
   the first hole having a first cross-sectional area and a first length and positioned at a position below and close to the inert gas introduction portion,
   a second hole having a second cross-sectional area and a second length positioned at a position below the first hole and spaced away by a predetermined distance from the first hole; and
   the chamber being formed at a position between the first hole and the second hole,
   the first hole and the chamber being communicated, and the chamber and the second hole being communicated,
   an optical fiber being drawn and passed through the first hole, the chamber, and the second hole in such order, and
   the chamber being communicated to a gas evacuating means in the gas entry prevention controlling means.

3. A furnace for forming an optic al fiber according to claim 2, wherein the first and second holes are formed to satisfy the following relation:

$$(L1/D1)<(L2/D2)$$

where,
   L1 Is a length of the first hole,
   D1 is a cross sectional area of the first hole,
   L2 is a length of the second hole, and
   D2 is a cross sectional area of the second hole.

4. A furnace for forming an optical fiber according to claim 3, wherein the gas entry prevention controlling means comprises:
   a pressure sensor for detecting the differential pressure between the first pressure in the inner space and the second pressure in the chamber,
   a pipe connected to the chamber,
   a pump connected to the chamber through the pipe to evacuate the gas in the chamber, and
   a pressure control valve that reads the differential pressure from the pressure sensor and controls a suction flow of the pump to maintain the differential pressure at the predetermined value.

5. A furnace for forming an optical fiber according to claim 4, wherein the differential pressure is within the range of 0.2 to 20 Pa.

6. A furnace for forming an optical fiber according to claim 3, wherein the bottom gas entry preventing means comprises:
   a first partition having the first hole, and
   a second partition having the second hole spaced away from it by a predetermined distance,
   the chamber being defined by the first and second partitions and a side wall connecting the first and second partitions.

7. A furnace for forming an optical fiber according to claim 3, wherein the bottom gas entry preventing means comprises a block cover formed by first and second partitions and the chamber.

8. A furnace for forming an optical fiber according to claim 1, wherein the bottom gas entry preventing means comprises:

- a first hole having a first cross-sectional area and a length and positioned at a position below and close to the inert gas introduction portion,
- a second hole having a second cross-sectional area and a length and positioned at a position below the first hole,
- a chamber formed around a circumferential portion of the second hole and connected to a pipe of the outside of the furnace body, and
- a slit connecting between the chamber and the second hole and having a downward inclination to an inner wall of the second hole and a width and wherein the gas entry prevention controlling means comprises
- a pressure sensor for detecting a differential pressure between the first pressure in the inner space and the second pressure in the first hole, and
- a controller that reads the differential pressure from the pressure sensor and controls the gas flow introduced to the inner space by the inert gas introduction means to maintain the differential pressure at the predetermined value.

9. A furnace for forming an optical fiber according to claim 8, wherein the differential pressure is within the range of 0.2 to 20 Pa.

10. A furnace for forming an optical fiber according to claim 9, wherein the angle of inclination of the slit is 5 to 20°.

11. A furnace for forming an optical fiber according to claim 10, wherein the width of the slit is 0.3 to 10 mm.

12. A furnace for forming an optical fiber according to claim 8, wherein the first cross-sectional area is not less than the second cross-sectional area.

13. A furnace for forming an optical fiber according to claim 12, wherein the bottom gas entry preventing means comprises a block cover formed by the first and second holes, the chamber, and the slit therein.

14. A furnace for forming an optical fiber according to claim 1, wherein the furnace tube is made of carbon.

15. A furnace for forming an optical fiber according to claim 1, wherein the inert gas comprises any one of argon gas, helium gas, and nitrogen gas.

16. A furnace for forming an optical fiber according to claim 8, wherein the gas flow introduced into the chamber comprises an inert gas.

* * * * *